United States Patent [19]

Cryder et al.

[11] 3,889,469

[45] June 17, 1975

[54] TANDEM MASTER CYLINDER WITH IN-LINE CHECK VALVES

[75] Inventors: John R. Cryder, Joliet; Lowell R. Hall, Manhattan, both of Ill.

[73] Assignee: Caterpillar Tractor Co., Peoria, Ill.

[22] Filed: Jan. 21, 1974

[21] Appl. No.: 434,778

[52] U.S. Cl. .................................................. 60/562
[51] Int. Cl. ............................................. F15b 7/00
[58] Field of Search .................. 60/562, 586 L, 581; 188/345, 106 P

[56] References Cited
UNITED STATES PATENTS 3,191,385  6/1965  Watanabe .............................. 92/63

3,210,941  10/1965  Stelzer .................................. 60/562

FOREIGN PATENTS OR APPLICATIONS 1,243,540  6/1967  Germany .............................. 60/581

Primary Examiner—Martin P. Schwadron
Assistant Examiner—H. Burks, Sr.
Attorney, Agent, or Firm—Phillips, Moore, Weissenberger Lempio & Strabala

[57] ABSTRACT

There is disclosed a dual master cylinder having axially disposed pistons within a single cylinder for actuating separate circuits of a brake system of a vehicle. Check valves for the separate circuits are disposed coaxially at one end of the cylinder.

10 Claims, 3 Drawing Figures

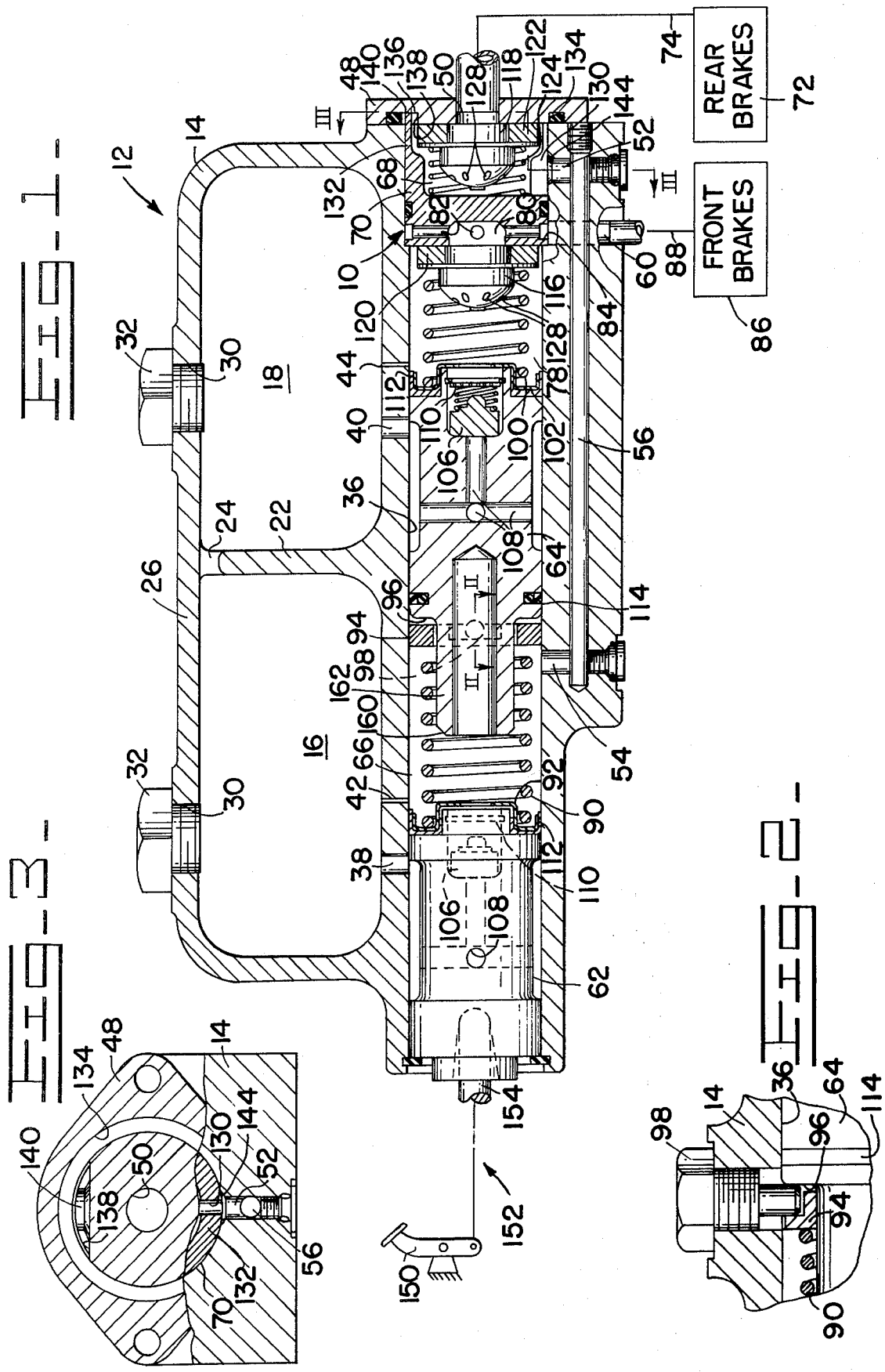

TANDEM MASTER CYLINDER WITH IN-LINE CHECK VALVES

BACKGROUND OF THE INVENTION

Tandem master cylinders have come into common use in hydraulic brake systems in recent years in view of safety legislation requiring a back-up system to insure that a vehicle may be stopped under all conditions. In such tandem systems, it is known to install the master cylinder pistons in line in a common bore with the pressure from the first piston actuating either the front or rear brakes with such pressure also moving the second piston to pressurize a second chamber for actuation of the other brakes of the vehicle. It is common practice in master cylinders of this type to provide residual pressure check valves between the master cylinder chambers and the brake lines to insure that the brake actuating cylinders and lines do not bleed down completely and to hold a low value residual pressure therein for quick response on the next brake application.

These check valves are commonly mounted adjacent its respective pressure chamber, and thus normally require large space-consuming bosses projecting laterally of the master cylinder housing adjacent the main piston bore of the master cylinder. This arrangement also requires extra space for the brake line which must necessarily be attached to the master cylinder.

The above-described systems require substantial additional machining for housing the check valves as well as being bulky and space-consuming in an area where space is generally at a premium, if available at all.

The prior art is exemplified by the following U.S. Pat. Nos.: 3,147,596 issued Sept. 8, 1964 to Wallace; 3,191,385 issued June 29, 1965 to Watanabe; 3,382,675 issued May 14, 1968 to Wallace; and 3,478,847 issued Nov. 18, 1969 to Bender et al.

SUMMARY AND OBJECTS OF THE INVENTION

In accordance with the present invention, a dual in-line master cylinder is provided with a pair of check valves co-axially disposed at the forward end thereof for controlling pressurized fluid in a pair of separate circuits of the brake system.

It is a primary object of the present invention to provide a dual master cylinder that overcomes the above-mentioned problems of the prior art.

It is another object of the present invention to provide a tandem master cylinder that is compact, simple and inexpensive.

BRIEF DESCRIPTION OF THE DRAWINGS

The above and other objects and advantages of the present invention will become apparent from the following description when read in conjunction with the accompanying drawings wherein:

FIG. 1 is an elevational view, in section, of a master cylinder in accordance with the present invention;

FIG. 2 is a detailed view of a portion of FIG. 1; and

FIG. 3 is a view in section taken generally along lines III — III of FIG. 1.

DETAILED DESCRIPTION OF A PREFERRED EMBODIMENT

With particular reference to FIG. 1 of the drawings, the present invention is best illustrated as comprising an in-line check valve assembly generally indicated at 10 as being operatively mounted in the forward end of a tandem brake master cylinder indicated generally at 12. The master cylinder 12 comprises a housing 14 having a pair of brake fluid storage reservoirs 16 and 18 which are separated by a vertical transversely extending web 22. The web includes an opening 24 adjacent an upper wall 26 to provide cross-communication between the fluid storage chambers 16 and 18. This permits both of the chambers to be filled through either of a pair of fill holes 30 which are normally sealed by a pair of plugs 32.

The housing 14 further includes an elongated cylindrical bore 36 disposed immediately below the fluid storage chambers 16 and 18 and communicating therewith through a pair of inlet or fill ports 38 and 40 and a pair of small diameter bleed ports 42 and 44. The output or forward end of the bore 36 is closed by a cap 48 which contains a first fluid output port 50. The output end of the bore 36 is communicated by way of a pair of substantially radial passages 52 and 54 and a horizontal interconnecting passage 56 to substantially a central portion of the bore 36. A second outlet port 60 communicates with bore 36 at the forward end adjacent to but slightly inboard of the radial passage 52 for purposes which will hereinafter be described.

A pair of substantially identical master cylinder pistons 62 and 64 are reciprocably mounted in slidable co-axial spaced relation in the bore 36 to define a first pressure chamber 66 between the piston and a second chamber forward of piston 64. The chamber 66 is communicated by way of passage 54, passage 56, and passage 52 to a chamber 68 formed in the outer or forward end of bore 36 by cap 50 and an adapter 70 forming a valve seat and manifold assembly sealingly disposed in the outer end of the bore.

The chamber 68 is in turn communicated with the rear brakes of a vehicle as indicated generally at 72 by way of outlet port 50 and a line 74. The piston 64 forms with the adapter 70 a second pressure chamber 78 forward of piston 64 which communicates by way of a chamber 80 in the adapter 70 a plurality of radial passages 82 and an annular groove 84 with the outlet port 60 for selective supply of pressure fluid to the front brakes 86 by way of a line 88.

The piston 62 is normally urged toward the retracted position shown by a spring 90 which is disposed between a spring retainer 92 seated against the inner face of the piston and a stop ring 94 disposed in bore 36 forward of piston 62 and adjacent the rear face 96 of the piston 64. The stop ring 94 is closely fitted in the bore 36 to avoid cocking and is retained against axial movement under the influence of spring 90 by suitable means such as a stop screw 98 as is best shown in FIG. 2. The stop screw 98 also serves to limit rearward movement of the piston 64 when the brakes are not applied.

A spring 100 is disposed between a spring retainer 102 seated against the front face of piston 64 and the adapter 70 to normally urge the piston 64 rearwardly against the stop screw 98. Each of the pistons 62 and 64 include the usual lightly spring loaded fill check valve 106 which permits filling of the chambers 66 and 78 by way of the ports 38 and 40 and suitable passages 108 in the pistons. A perforated disc 110 limits outward movement of the check valves 106 while permitting free flow of fluid into the pressure chambers from the reservoirs 16 and 18. A cup-type seal 112 is provided at the inner ends of pistons 62 and 64 for sealing the chambers 66 and 78. The piston 64 is also provided with a seal 114 adjacent the rearward face 96 thereof to prevent leakage from the pressure chamber 66 into the fill passages 108 and reservoir 18 for the piston 64.

An important feature of this invention resides in the disposition and arrangement of a pair of residual pressure check valves 116 and 118. The check valve 116 between the pressure chamber 78 and the chamber 80 is constructed and arranged to be normally urged against an elastomeric seat 120 by the spring 100. The check valve 118 is mounted in fluid flow controlling relation between the chamber 68 and the outlet port 50 and is normally biased against an elastomeric seat 122 by a relatively light spring 124. The check valves 116 and 118 are of the usual type which permits flow from the pressure chambers 66 and 78 through a plurality of reed valve controlled ports 128 for communication of pressure to the brakes 72 and 86 when the pistons 52 and 64 are moved rightwardly to pressurize the chambers 55 and 78.

This in-line co-axial spaced mounting of the check valves 116 and 118 within the outer end of bore 36 results in a compact, simplified, easy to assemble master cylinder and eliminates the need for laterally disposed bosses having bores therein communicating with the chambers 66 and 78 for housing of the check valves.

The use of the adapter plug or housing 70 provides for this in-line mounting of the residual pressure check valves by providing separation between the flow path from the chamber 78 and the flow path from the chamber 66. This plug 70 also reduces machining and space requirements by utilizing an extension of the main piston bore 36.

Communication of fluid pressure from the chamber 66 to the chamber 68 by way of the passages 54, 56 and 52 is provided by a slot 130 in the longitudinally extending flange portion 132 of the adapter 70. Since the slot 130 is relatively narrow, it is important that the adapter 70 be installed in the bore 36 in proper relation to the passage 52 to insure communication therebetween. For this purpose, the cap 48 includes a seal groove 134 which has a milled out portion 136 to provide a flat surface 138 therein as best shown in FIG. 3. The adapter 70 includes an axially extending tang 140 which is disposed diametrically opposite the groove 130 and is adapted for loose mating extension into the milled portion 136 of the seal groove 134. This arrangement permits only limited rotational variation in the position of the adapter 70 and in combination with a spherical counterbore 144 in the passage 52 insures that communication will be provided between the passage 42 and the chamber 68.

While the operation of the present invention is believed apparent from the foregoing description, further amplification will be made in the following brief summary. When the operator depresses a brake control member such as a pedal 150, that action through a suitable linkage indicated schematically at 152, and a master cylinder push rod 154 urges the piston 62 rightwardly whereby the seal 112 blocks the vent port 42 to pressurize the chamber 66. This pressure is communicated as previously described through the outlet port 50 from where it is directed to the rear brakes 72 to effect engagement of those brakes. Simultaneously, the pressure in chamber 66 acting on the face 96 of piston 64 urges that piston rightwardly whereby seal 112 blocks vent port 44 to pressurize the fluid in the chamber 78. That pressure is communicated by way of the residual pressure check valve 116, chamber 80, radial passages 82, annular groove 84, outlet port 60, and line 88 to the front brakes 86 for engagement thereof.

The pressure in the brakes 72 and 86 flows back through the lines 74 and 88 and outlet ports 50, 60 and returns to the chambers 66 and 78 by lifting the residual check valves 116 and 118 from the elastomeric seat members 120 and 122. When the pressure in the lines 78 and 88 equals the force of the springs 100 and 124 the check valves will seat, thus holding a slight residual pressure in the brake lines to provide immediate response upon the next actuation of the brake pedal 150.

Should the seal 112 associated with the piston 62 or line 74 fail, movement of the piston to the right will cause it to mechanically engage the rearward end 160 of an extension 162 of the piston 64. Continued depression of the brake pedal will move both pistons as a unit rightward to pressurize the chamber 78 and actuate the front brake 86 even though no pressure is available in the chamber 66 for actuation of the rear brakes 72. On the other hand, should the seal 112 associated with the piston 64 or line 88 fail so as to prevent pressurization of chamber 78, pressure in the chamber 66 will be effective to engage the rear brakes 72 and thus afford the operator the ability to stop the vehicle.

From the above description, it is seen that there is provided a novel construction for a dual piston master cylinder having a compact, simple, and inexpensive arrangement of check valves. The separate check valves are co-axially disposed in a sleeve assembly in an extension of the cylinder bore and provided with a novel conduit arrangement communicating with the respective pressure chambers.

While the invention is disclosed and described with respect to a single embodiment, it is to be understood that numerous changes and modifications may be made in the illustrated embodiment without departing from the spirit of the invention as defined by the appended claims.

What is claimed is:

1. A tandem master cylinder assembly for a dual brake system, said assembly comprising:
    a housing having an elongated cylindrical bore formed therein, said bore having a first end and a second end;
    a fluid reservoir adjacent said bore and communicating therewith;
    first and second pistons axially reciprocably mounted in said bore for movement in a forward direction toward said first end and a rearward direction toward said second end and operative upon movement in said forward direction to pressurize fluid within said cylinder ahead of said respective pistons, said pistons dividing said bore into first and second chambers;
    first and second outlet means for separately communicating pressurized fluid from each of said first and second chambers; and,
    first and second check valve means disposed along the axis of said bore at said first end for separately controlling said outlets.

2. The master cylinder assembly of claim 1 wherein said check valves are coaxially disposed within the first end of said bore.

3. The master cylinder assembly of claim 1 comprising a valve seat and manifold assembly removably mounted in said first end of said bore; and means communicating said first and second chambers defined by said pistons in said bore with said outlets via said manifold and valve seat.

4. The master cylinder assembly of claim 3 wherein said valve and manifold assembly includes annular means communicating said first chamber with one of said outlets.

5. The master cylinder assembly of claim 1 comprising:

biasing means for biasing said first and second pistons away from said first end to their respective rearmost positions within said bore; and, said biasing means including means independent of the first piston for biasing the second piston to its rearmost position.

6. The master cylinder assembly of claim 1 comprising:

means detachably mounted in said bore intermediate said pistons for defining stop means for limiting the rearward travel of the first of said pistons.

7. The master cylinder assembly of claim 6 wherein said stop means comprises a ring member detachably secured within said bore between said pistons.

8. The master cylinder assembly of claim 7 comprising biasing means independent of said first piston for biasing the second of said pistons to its rearmost position within said bore, said biasing means including a compression spring mounted between and in engagement with said ring member and the second of said pistons.

9. The master cylinder assembly of claim 7 wherein the first of said pistons includes a rearward extension extending beyond said stop means for engagement by the forward end of said second piston for actuation thereof only if fluid pressure between said pistons should fail during forward movement of said second piston.

10. The master cylinder assembly of claim 3 wherein said manifold assembly separates said first chamber from a valve chamber at the first end of said bore and includes means communicating the pressure from said second chamber via said second outlet with the rear wheel brakes of a vehicle; and, the first of said outlets communicates the pressure in the first chamber with the front wheel brakes of a vehicle.

* * * * *